United States Patent
Morris et al.

(10) Patent No.: US 9,644,753 B2
(45) Date of Patent: May 9, 2017

(54) FLAPPER EXHAUST DIVERTER VALVE

(71) Applicant: Norgren Limited, Staffordshire (GB)

(72) Inventors: John Michael Morris, Auburn, WA (US); Mark Edward Byers Sealy, Warwickshire (GB); Christopher Edward Narborough, Derbyshire (GB); William Benjamin Boult, Bristol (GB)

(73) Assignee: Norgren Limited, Lichfield (GB)

( * ) Notice: Subject to any disclaimer, the term of this patent is extended or adjusted under 35 U.S.C. 154(b) by 0 days.

(21) Appl. No.: 14/897,120

(22) PCT Filed: Jul. 14, 2014

(86) PCT No.: PCT/EP2014/065425
§ 371 (c)(1),
(2) Date: Dec. 9, 2015

(87) PCT Pub. No.: WO2015/007859
PCT Pub. Date: Jan. 22, 2015

(65) Prior Publication Data
US 2016/0123482 A1    May 5, 2016

Related U.S. Application Data

(60) Provisional application No. 61/847,141, filed on Jul. 17, 2013.

(51) Int. Cl.
*F01N 3/00* (2006.01)
*F16K 11/052* (2006.01)
*F01N 5/02* (2006.01)
*F02D 9/10* (2006.01)
(Continued)

(52) U.S. Cl.
CPC .............. *F16K 11/052* (2013.01); *F01N 5/02* (2013.01); *F01N 13/08* (2013.01); *F02D 9/103* (2013.01);
(Continued)

(58) Field of Classification Search
USPC .......... 60/274, 287, 288, 289, 291, 292, 296, 60/298, 320, 322, 324; 137/625.31, 599,
(Continued)

(56) References Cited

U.S. PATENT DOCUMENTS 5,908,047 A *   6/1999   Nakamura .............. F01N 3/027
                                                     137/625.44
6,896,000 B2 *  5/2005   Brenner .................. F01N 3/029
                                                     137/597

(Continued)

FOREIGN PATENT DOCUMENTS

| DE | 10329336 A1 | 1/2005 |
| EP | 0819875 A1 | 1/1998 |
| EP | 1748179 A1 | 1/2007 |
| EP | 2236808 A2 | 10/2010 |
| FR | 2854200 A1 | 10/2004 |
| WO | 03085252 A2 | 10/2003 |

*Primary Examiner* — Binh Q Tran
(74) *Attorney, Agent, or Firm* — The Ollila Law Group LLC

(57) ABSTRACT

A flapper exhaust diverter valve (110) is provided. The flapper exhaust diverter valve (110) includes a valve body (210) comprising an exhaust inlet (212), an evaporator outlet (214), and a bypass outlet (216). The flapper exhaust diverter valve (110) also includes a flapper assembly (310) that is rotatably coupled to the valve body (210) at a first distal end (310a) of the flapper assembly (310).

24 Claims, 5 Drawing Sheets

(51) Int. Cl.
*F16K 1/18* (2006.01)
*F16K 1/20* (2006.01)
*F01N 13/08* (2010.01)
*F02M 26/26* (2016.01)

(52) U.S. Cl.
CPC ............ *F02D 9/1005* (2013.01); *F02M 26/26* (2016.02); *F16K 1/18* (2013.01); *F16K 1/20* (2013.01); *F16K 1/2042* (2013.01); *F01N 2240/02* (2013.01); *F01N 2390/00* (2013.01); *F01N 2390/02* (2013.01); *F01N 2410/00* (2013.01); *Y02T 10/16* (2013.01)

(58) Field of Classification Search
USPC .................................................... 137/115.13
See application file for complete search history.

(56) References Cited

U.S. PATENT DOCUMENTS

| | | | | |
|---|---|---|---|---|
| 6,955,188 | B2* | 10/2005 | Heckt | F01N 3/031 137/87.01 |
| 7,600,380 | B2* | 10/2009 | Grissom | F02B 37/007 137/625.44 |
| 7,617,678 | B2* | 11/2009 | Joergl | F02M 26/16 123/568.12 |
| 2008/0314037 | A1* | 12/2008 | Neels | B01D 53/9431 60/324 |
| 2012/0017575 | A1* | 1/2012 | Sloss | F01N 5/02 60/320 |

\* cited by examiner

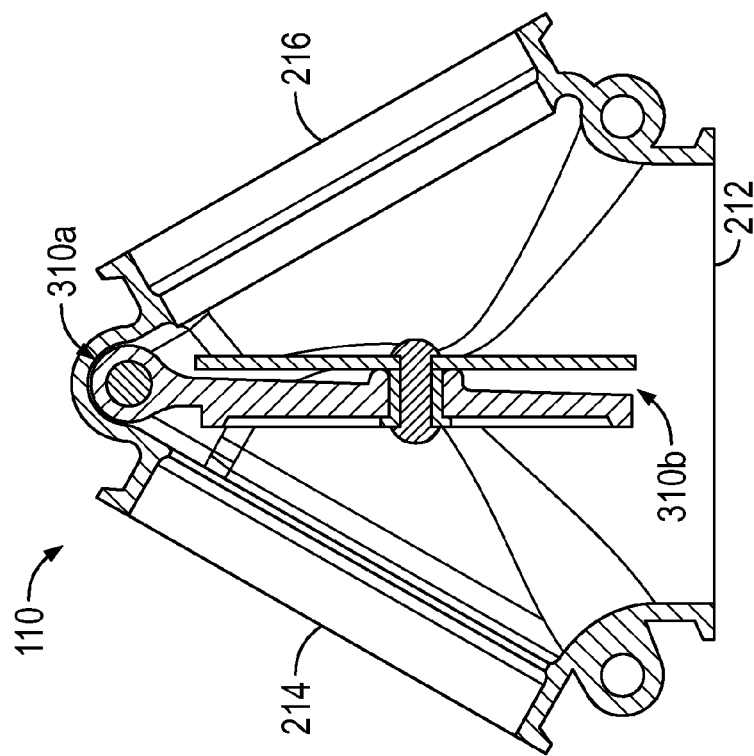
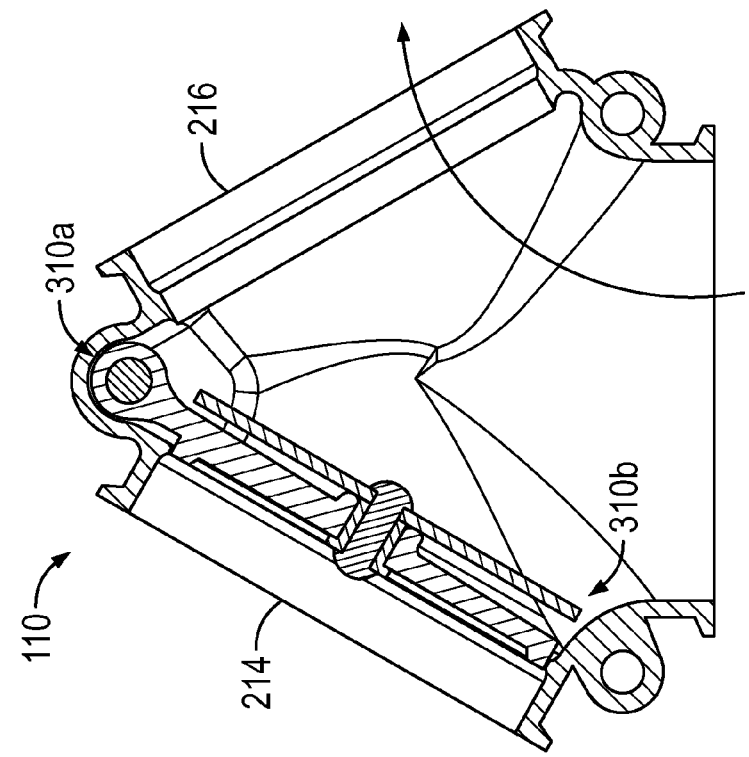
FIG. 4B
FIG. 4A

FLAPPER EXHAUST DIVERTER VALVE

TECHNICAL FIELD

The embodiments described below relate to, exhaust diverter valves, and more particularly, to exhaust diverter valves for a waste heat recovery system.

BACKGROUND

Internal combustion (IC) engines are used throughout the world and mainly for motor vehicles. IC engines account for one of the largest consumers of petroleum products known. Due to the large amount of petroleum products consumed by IC engines and the gases exhausted from IC engines, numerous regulatory agencies have implemented regulations or are in the process of implementing regulations that require minimum average fuel economy of vehicles as well as limit the amount of pollutants that are exhausted from vehicles.

Earlier attempts at reducing vehicle emissions have centered on exhaust gas treatments. For example, earlier attempts have introduced reagents into the exhaust gas stream prior to the gas passing through a catalyst in order to effect selective catalytic reduction (SCR) of the nitrogen oxides ($NO_x$) in the exhaust gases. Additionally, many vehicles now include exhaust gas recirculation (EGR) systems to recirculate at least some of the exhaust gases. Although EGR reduces the harmful emissions of vehicles, it also often reduces the vehicle's fuel economy.

The uses of SCR and EGR have been effective in reducing the emission problems in the exhaust stream, but have done little in improving the fuel economy and fuel consumption of vehicles. With the tighter regulations that are being implemented, many manufacturers have turned their focus to increasing the fuel economy of IC engines. It is generally known that only about thirty to forty percent of the energy produced by the fuel combustion of IC engines translates to mechanical power. Much of the remaining energy is lost in the form of heat. Therefore, one particular area of focus in the motor vehicle industry has been to recover some of the heat that is generated by the IC engine using a waste heat recovery system that converts heat into mechanical energy with, for example, a Rankine cycle.

Waste heat recovery systems typically use a working fluid, such as water, to recover the waste heat from the engine. Other fluids, such as ethanol, may also be used due to properties such as heat transfer or vapor pressure properties. Evaporators are typically used to transfer heat from the exhaust to the working fluid. The heat may convert the working fluid to a gas. The gas may then be conveyed to an expander where the heat is converted into mechanical energy.

However, heat transfer to the working fluid may not always be desirable. For example, heat transfer to the gas that is contained by an obstruction in the waste heat recovery system may not be desirable. Transferring heat to contained gas can cause an undesirable level of pressure that could cause damage to the evaporator or a condenser in the waste heat recovery system. Additionally, transferring heat from the exhaust system to the working fluid may not be desirable when the engine is heating up the exhaust system. For example, transferring heat from the exhaust system will increase the time it takes the engine to heat the exhaust system. Heat transfer to the working fluid can be reduced or eliminated by limiting or preventing exhaust flow to the evaporator. Accordingly, there is a need to limit or prevent exhaust flow to the evaporator.

DISCLOSURE OF THE INVENTION

According to a first aspect of the invention, an engine exhaust gas diverter valve (110) comprises:
 a valve body (210) comprising
  an exhaust gas inlet (212),
  a first exhaust gas outlet (214) having a periphery, and
  a second exhaust gas outlet (216) having a periphery;
  the valve body defining a first exhaust gas flow path (Q) from the exhaust gas inlet (212) to the first exhaust gas outlet (214) and a second exhaust gas flow path (P) from the exhaust gas inlet (212) to the second exhaust gas outlet (216);
 a flapper assembly (310) coupled to the valve body (210) for rotation about a first axis (230) between a position in which it approaches the periphery of the first exhaust gas outlet (214) and a position in which it approaches the periphery of the second gas outlet (216), the first axis being located at a first extremity (310a) of the flapper assembly (310) and substantially outside of the first and second flow paths.

Pivoting the flapper assembly at one end, in an area substantially outside of the flow paths and consequently of low flow, reduces turbulence in the flow paths and consequent pressure and energy loss.

Preferably, the flapper assembly is configured to form a substantially planar seal with the periphery of the second exhaust gas outlet (216), the first axis (230) lying outside of the seal when viewed in a direction normal to the plane of the seal.

Preferably, the flapper assembly (310) has a second, distal end (310b), remote from the first extremity (310a) that is oriented towards the exhaust inlet (212) while rotating.

Preferably, the flapper assembly (310) comprises a flapper arm (312) that is rotatably coupled to the valve body (210) via a shaft (230) and a sealing plate (314) coupled to the flapper arm (312).

Preferably, the periphery of the first exhaust gas outlet (214) comprises a shoulder (214a), the flapper arm being rotatable to an extreme position adjacent the shoulder (214a) so as to restrict flow through the first exhaust gas outlet (214) and direct exhaust gas flow through the second exhaust gas outlet (216).

Preferably, the periphery of the second exhaust gas outlet (216) comprises a lip (216a), the flapper arm being rotatable to an extreme position adjacent the lip in which the sealing plate (314) presses against the lip so as to prevent exhaust gas flow through the second exhaust gas outlet (216) and divert exhaust gas flow through the first exhaust gas outlet (214).

Preferably, the sealing plate (314) is loosely coupled to the flapper arm (312).

Preferably, the flapper assembly (310) further comprises a rivet (316) and a rivet shell (318) that couples the seal plate (314) to a flapper arm (312).

Preferably, the flapper exhaust diverter valve (110) further comprises an actuator (220) adapted to rotate the flapper assembly (310) about the shaft (230).

According to a second aspect, a method of forming an engine exhaust gas diverter valve (110) comprises steps of:
 forming a valve body (210) comprising an exhaust gas inlet (212), a first exhaust gas outlet (214) and a second exhaust gas outlet (216); and forming and rotatably coupling a flapper assembly (310) to the valve body (210) at a first distal end (310a) of the flapper assembly (310), Preferably, the step of coupling the flapper assembly (310) to the valve body (210) comprises coupling the flapper assembly (310) such that a second distal end (310b) is oriented towards the exhaust inlet (212) while rotating.

Preferably, the method of forming the flapper assembly (310) comprises steps of:
forming and rotatably coupling a flapper arm (312) to the valve body (210) at a shaft (230); and
forming and coupling a sealing plate (314) to the flapper arm (312).

Preferably, the method comprises forming the periphery of the first exhaust gas outlet (214) with a shoulder (214a) and adapting the flapper arm (312) so as to restrict flow through the first exhaust gas outlet (214) and direct exhaust to the bypass outlet (216) when rotated to an extreme position adjacent the shoulder.

Preferably, the method comprises forming the periphery of the second exhaust gas outlet (216) with a lip (216a) and adapting the flapper arm (312) such that the sealing plate (314) presses against the lip (216a) so as to to divert exhaust to the evaporator outlet (214) and prevent exhaust from flowing through the bypass outlet (216).

Preferably, the method of forming the flapper assembly (310) further comprises loosely coupling the sealing plate (314) to the flapper arm (312).

Preferably, the method of forming the flapper assembly (310) further comprises forming a rivet (316) and a rivet shell (318) and coupling the seal plate (314) to the flapper arm (312) with the rivet (316) and the rivet shell (318).

Preferably, the method of forming the flapper exhaust diverter valve (110) further comprises forming and adapting an actuator (220) to rotate the flapper assembly (310).

According to a third aspect, there is provided an engine exhaust gas diverter valve (110), comprising:
a valve body (210) defining:
an inlet (212) configured for exhaust gas inflow along a first axis;
a first outlet (214) configured for exhaust gas outflow along a second axis; and
a second outlet (216) configured for exhaust gas outflow along a third axis;
a valve member (310) for diverting exhaust gas inflow through the first and/or second outlets;
wherein the second and third axes are arranged symmetrically to either side of, and at an acute angle to, the first axis.

Such a 'Y' configuration of inlet and outlets results in a valve of greater compactness and lower weight.

Preferably, the second and third axes are each arranged at an angle to the first axis lying in the range from 40° to 80°.

Preferably, the second and third axes are each arranged at an angle to the first axis of about 60°.

According to a fourth aspect, there is provided an engine exhaust gas valve (110) comprising:
a valve body (210) comprising an exhaust gas inlet (212) and at least one exhaust gas outlet (214) having a periphery;
a flapper assembly (310) coupled to the valve body (210) for rotation into a position in which it forms a seal with the periphery of the first exhaust gas outlet, the assembly comprising:
a first member rotatably coupled to the valve body, and
a second member configured to sealingly engage the periphery of the first exhaust gas outlet and to move relative to the first member.

Such a second member loosely mounted on the first member can adjust to the geometry of the exhaust gas outlet regardless of wear, fabrication tolerances and/or thermal movement.

Preferably, the valve comprises first and second exhaust gas outlets each having a respective periphery, the flapper assembly having second members respectively configured to sealing engage the periphery of the first exhaust gas outlet and the periphery of the second exhaust gas outlet, the members being configured to move relative to the first member.

According to a fifth aspect, an engine exhaust gas diverter valve (110) comprises:
a valve body (210) comprising
an exhaust gas inlet (212),
a first exhaust gas outlet (214) having a periphery, and
a second exhaust gas outlet (216) having a periphery;
a flapper assembly (310) that is coupled to the valve body (210) for rotation between a first limit in which it approaches the periphery of the first exhaust gas outlet (214) and a second, opposite limit in which it approaches the periphery of the second gas outlet (216),
wherein the flapper assembly has a clearance fit with the periphery of the first exhaust gas outlet when at the first limit and a sealing fit with the periphery of the second exhaust gas outlet when at the second limit.

Such an arrangement facilitates good sealing of the second exhaust gas port while allowing a clearance between the flapper assembly and the first exhaust gas port that reduces the risk of the flapper assembly sticking in that port. This may particularly be the case in a waste heat recovery system where the first port connects to an evaporator and the second port connects to an evaporator bypass: when the system is idle, the flapper assembly moves to open the bypass port and close the evaporator port. Since the system may be idle for some time (if the vehicle is not used), the clearance between the flapper assembly and the first, evaporator port reduces the risk of the flapper assembly binding/sticking in that port.

According to a sixth aspect, the present invention also provides a system for recovering waste heat from the exhaust of an engine, the system comprising:
an evaporator adapted to transfer waste heat from an engine to a working fluid;
an evaporator bypass; and
an engine exhaust gas diverter valve as set out above,
wherein the first exhaust gas outlet is connected to the evaporator and the second exhaust gas outlet is connected to the evaporator bypass.

It will be understood that the various aspects can be particularized by the other aspects.

BRIEF DESCRIPTION OF THE DRAWINGS

The same reference number represents the same element on all drawings. It should be understood that the drawings are not necessarily to scale.

FIGS. 4a-c show the flapper assembly 310 in three positions according to an embodiment.

DETAILED DESCRIPTION

FIGS. 1-5 and the following description depict specific examples to teach those skilled in the art how to make and use the best mode of embodiments of a flapper exhaust diverter valve. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the flapper exhaust diverter valve. As a result, the embodiments described below are not limited to the specific examples described below, but only by the claims and their equivalents.

There are significant technical hurdles to overcome in providing a flapper exhaust diverter valve that limits or prevents the exhaust flow to the evaporator. For example, some IC engines, such as diesel engines, might be required to reduce particulate emissions by reducing the number of particles in the exhaust system. The number of particles in the exhaust system can be reduced by heating the exhaust system to temperatures in excess of 500° C. during a regeneration cycle. Such temperatures might be sufficient to damage the evaporator. Additionally, a wide range of normal operating temperatures, which may be from 200° C. to 500° C., can cause significant variation in the dimensions of components attached to the exhaust system due to expansion and contraction. The flapper exhaust diverter valve might be required to divert almost all of the exhaust to the evaporator with little to no leakage to the exhaust pipe. This hurdle may be due to waste heat recovery efficiency specifications from the vehicle's manufacturer. In addition, pressure drops in the exhaust system are sometimes limited to, for example, less than 4 kPa for exhaust flows of 0.55 kg/s at 500° C. These pressure drops can be caused by turbulence in the exhaust flow.

Accordingly, the flapper exhaust diverter valve might be required to shield the evaporator from the heat in the exhaust system and reliably prevent exhaust from reaching the evaporator despite expansion and contraction of components. In addition, the flapper exhaust diverter valve should not cause turbulence in the exhaust flow.

Figure 1:
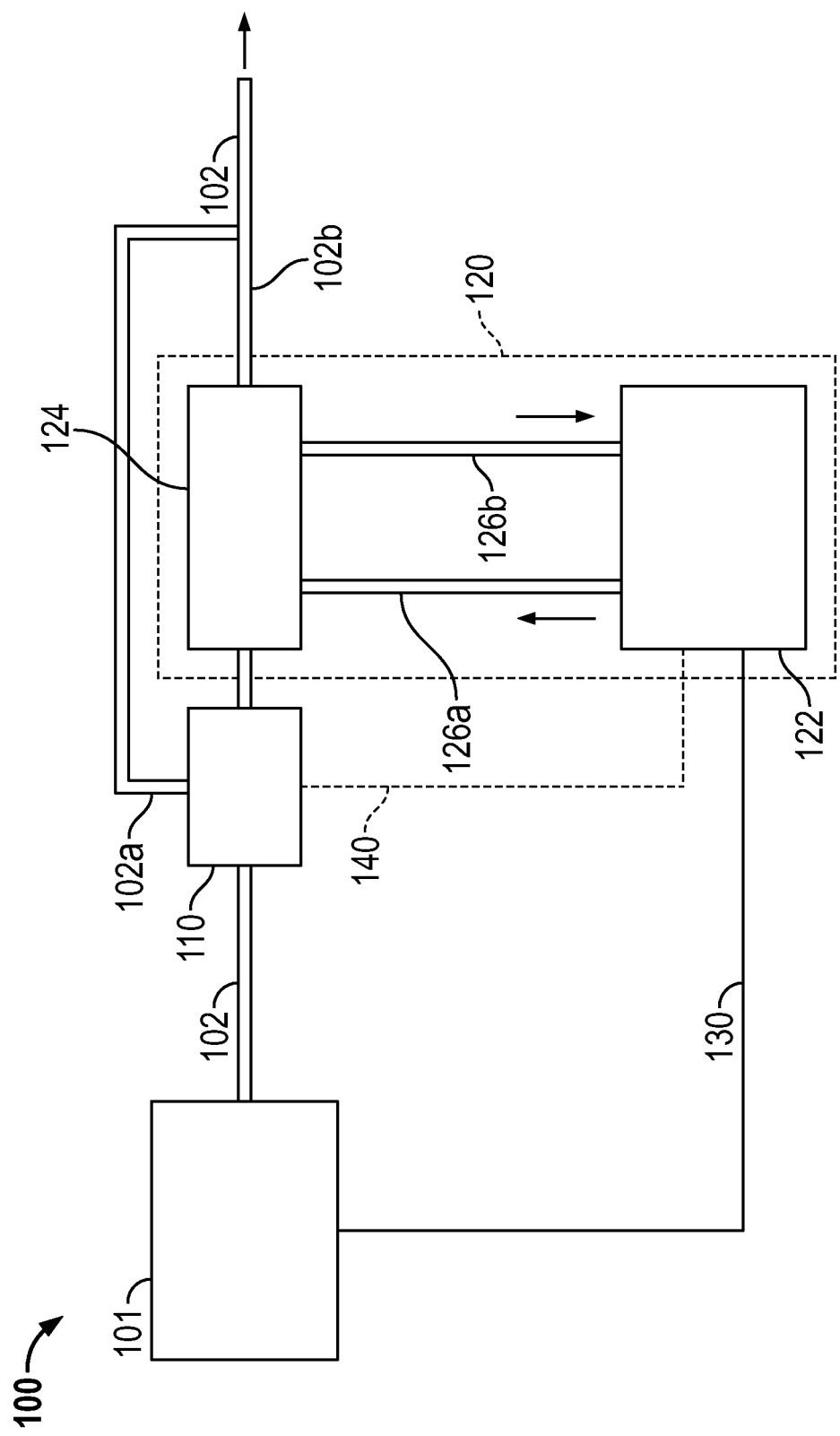
FIG. 1 shows a simplified schematic of a waste heat recovery system 100 according to an embodiment.

FIG. 1 shows a simplified schematic of a waste heat recovery system 100 according to an embodiment. As shown, the waste heat recovery system 100 includes a flapper exhaust diverter valve 110 that is coupled to an exhaust pipe 102. The flapper exhaust diverter valve 110 is adapted to direct exhaust to the evaporator 124. Therefore, the waste heat recovery subsystem 120 may receive waste heat from the exhaust. The flapper exhaust diverter valve 110 is also adapted to divert the exhaust from the evaporator 124 to an exhaust bypass 102a.

The engine 101 is an IC engine although any suitable engine may be employed. The exhaust pipe 102 is shown as coupled to the engine 101 and the evaporator 124. The evaporator 124 and an expander 122 are part of the waste heat recovery subsystem 120. The evaporator 124 is in fluid communication with the expander 122 via fluid and/or vapor control modules, pumps, and condensers. For clarity, the fluid communication is represented in a simplified manner by conduits 126a,b. Accordingly, the evaporator 124 can transfer the heat to the expander 122 with working fluid flow as shown by arrows in FIG. 1. The expander 122 returns mechanical energy to the engine 101 via a coupler 130. After flowing through the evaporator 124, the exhaust returns to the exhaust pipe 102 via an exhaust return 102b. Additionally, the flapper exhaust diverter valve 110 is shown as being in communication with the waste heat recovery subsystem 120 via a communication line 140. Accordingly, the flapper exhaust diverter valve 110 directs exhaust to and diverts exhaust from the evaporator 124. The flapper exhaust diverter valve 110 also regulates exhaust flow to the evaporator 124 as will be described in more detail in the following with reference to FIGS. 2-5.

Figure 2:
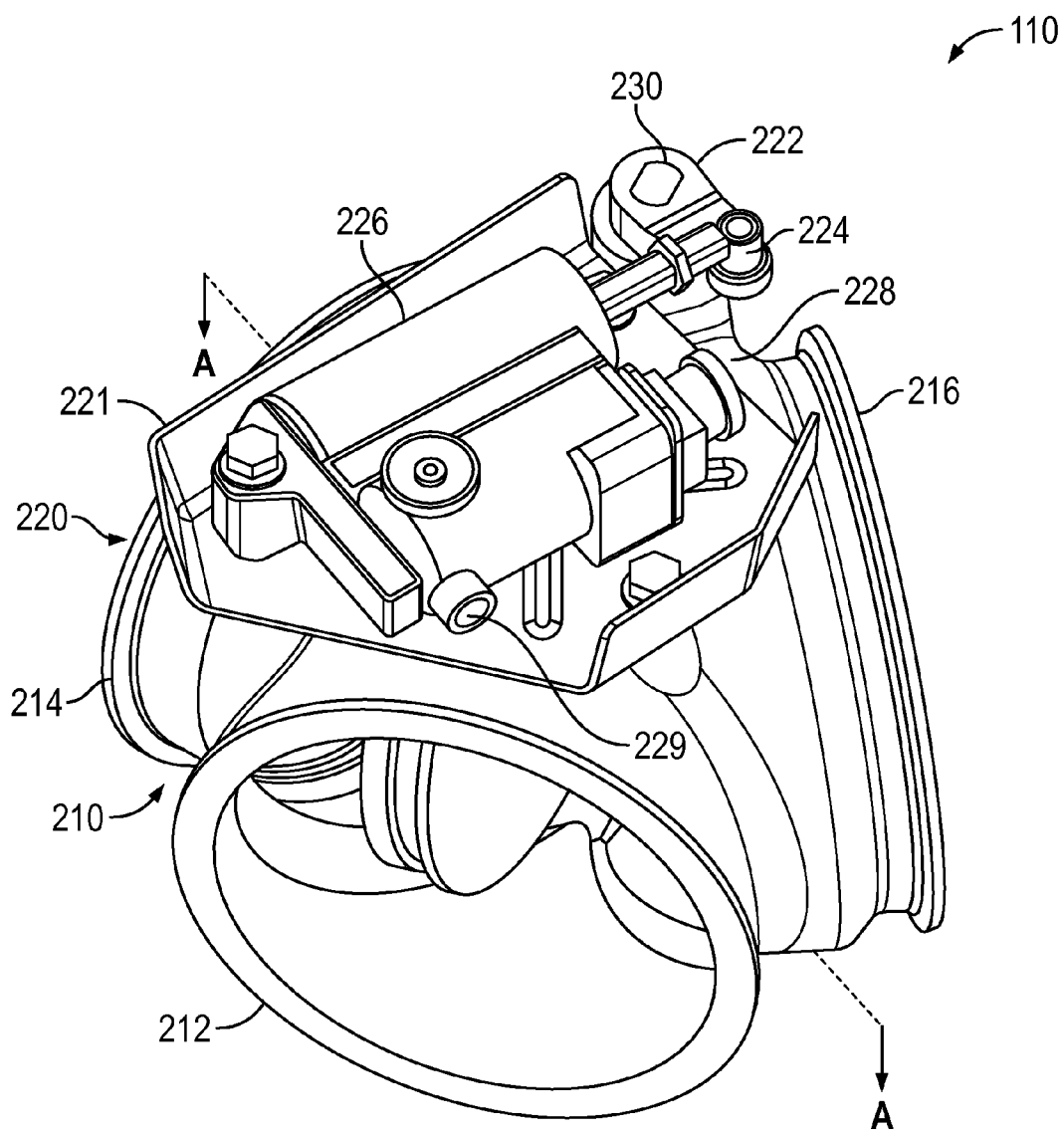
FIG. 2 shows a perspective view of the flapper exhaust diverter valve 110 according to an embodiment.

FIG. 2 shows a perspective view of the flapper exhaust diverter valve 110 according to an embodiment. The flapper exhaust diverter valve 110 includes a valve body 210 that is coupled to an actuator 220. The valve body 210 includes an exhaust inlet 212, an evaporator outlet 214, and a bypass outlet 216. The exhaust inlet 212 is shown as coupled to the exhaust pipe 102 and to receive exhaust from the engine 101. The evaporator outlet 214 is coupled to the evaporator 124. The bypass outlet 216 is coupled to the exhaust bypass 102a. The actuator 220 is shown as coupled to the valve body 210 via a bracket 221. The bracket 221 may also shield the actuator 220 from the exhaust heat. The valve body 210 is comprised of silicon iron although any suitable material may be employed. The exhaust inlet 212, the evaporator outlet 214, and the bypass outlet 216 are flange fittings compatible with standard exhaust fittings on vehicles such as 5.5" v-clamp flanges. However, any suitable fittings may be employed.

Figure 5:
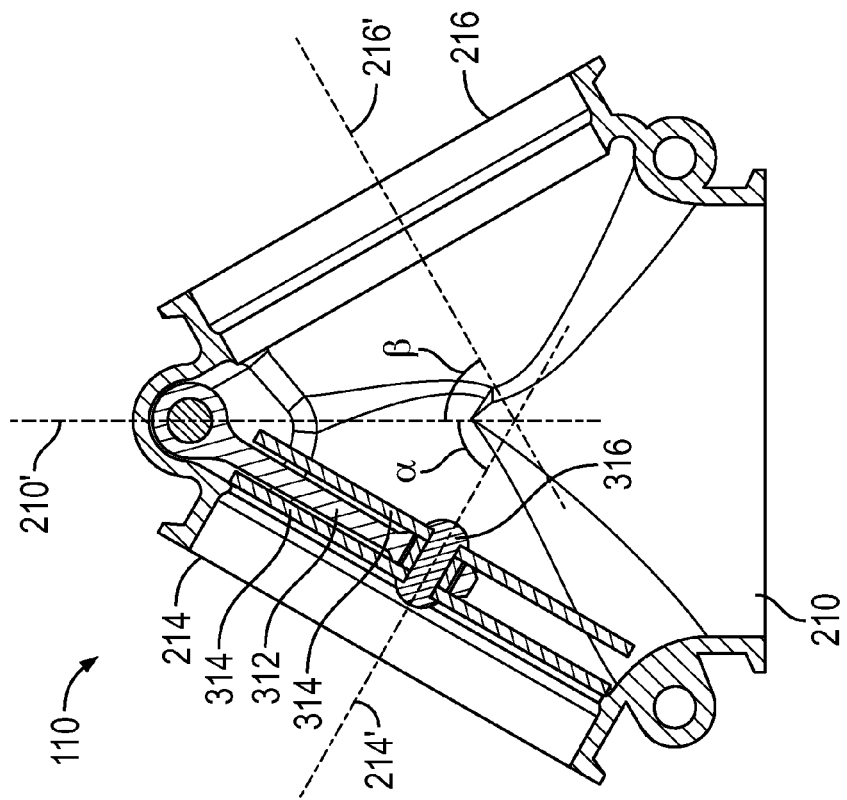
FIG. 5 shows a sectional view through an alternative embodiment of valve to that shown in FIGS. 4a-c.

As shown in FIG. 5, wherein the flow axes 214', 216' of outlets 214 and 216 are arranged symmetrically to either side of, and at an acute angle α,β to, the first axis 210'. Although potentially in the range from 40° to 80°, α and β are about 60° in the embodiment shown. Such a 'Y' configuration of inlet and outlets results in a valve of greater compactness and lower weight.

The actuator 220 is shown as coupled to a shaft 230. The shaft 230 can be rotated by the actuator 220. The actuator 220 may be comprised of a link 222 coupled to a pin 224 that is coupled to a cylinder 226. The cylinder 226 can therefore press or pull on the link 222 to rotate the shaft 230 to turn a flapper assembly. The flapper assembly is described in more detail with reference to FIGS. 3-4b. The cylinder 226 can be controlled by the waste heat recovery subsystem 120 via a control port 228. The control port 228 is coupled to the communication line 140 described with reference to FIG. 1. Pneumatic air is provided to the pneumatic supply port 229. The pneumatic air is regulated by a solenoid (not shown) in the actuator 220. The actuator can be controlled by the waste heat recovery subsystem 120 through the control port 228. The actuator 220 may also be coupled to a sensor (not shown) that senses the position of the shaft 230. However, any suitable sensor or parameter, such as exhaust flow ratio, pressure, or the like can be employed.

The link 222 is adapted to use a linear motion by the cylinder 226 to rotate the shaft 230. The link 222 provides an appropriate moment arm so the cylinder 226 can rotate the shaft 230. For example, the link 222 can be sized so the distance between the shaft 230 and the pin 224 may be sufficient so the cylinder 226 may rotate the shaft 230. The pin 224 is a freely rotating pin although any suitable pivot means may be employed. The pin 224 freely rotates so as to efficiently turn the shaft 230. The cylinder 226 can be a spring returned pneumatic cylinder. Accordingly, if the cylinder 226 loses power while in an actuated position, the spring in the cylinder 226 can rotate the shaft 230 to a position that does not divert exhaust to, for example, the evaporator 124. Therefore, the actuator 220 can rotate a flapper valve assembly in the flapper exhaust diverter valve 110 to divert, direct, and regulate the exhaust as will be described in more detail in the following with reference to FIGS. 3-4c.

Figure 3:
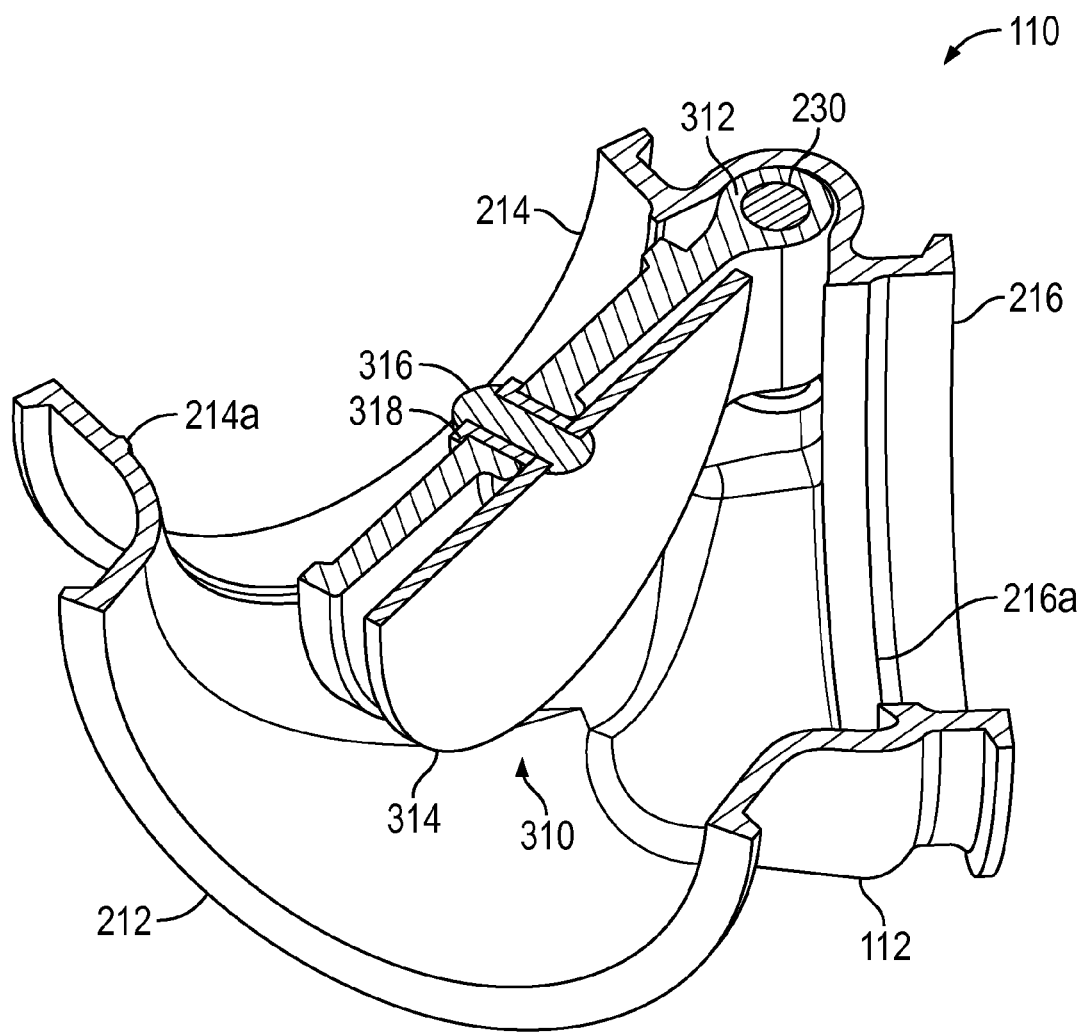
FIG. 3 shows a sectional view of the flapper exhaust diverter valve 110 taken at a-a shown in FIG. 2 according to an embodiment.

FIG. 3 shows a sectional view of the flapper exhaust diverter valve 110 taken at a-a shown in FIG. 2 according to an embodiment. A flapper assembly 310 is rotatably coupled to the valve body 112. As shown, the flapper assembly 310 includes a sealing plate 314 that is coupled to a flapper arm 312. A rivet 316 and a rivet shell 318 couples the sealing plate 314 to the flapper arm 312. The flapper arm 312 is coupled to the shaft 230 for rotation about a corresponding axis. The shaft 230 may rotate the flapper assembly 310 between the evaporator outlet 214 and the bypass outlet 216. Therefore, the flapper assembly 310 can regulate—in a proportional or digital fashion—the exhaust flow between the exhaust inlet 212 and the evaporator and bypass outlets 214, 216.

As shown in FIG. 3, the evaporator outlet 214 includes a peripheral shoulder 214a that may be adapted to loosely interface with the flapper arm 312, providing a clearance fit between the flapper assembly with the periphery of the evaporator outlet. For example, the shoulder 214a might have an inside diameter that is larger than an outer diameter of the flapper arm 312. Accordingly, the shoulder 214a may not bind with the flapper arm 312 when, for example, there is soot on the shoulder 214a or the flapper arm 312. This loose interface also allows the flapper arm 312 and the shoulder 214a to expand and contract without causing significant change in the exhaust flow through the evaporator outlet 214 or causing the flapper arm 312 to stick to the shoulder 214a. The expansion and contraction can be due to temperature variations in the exhaust system. The precise dimensions can further be chosen enable modulation of the flow when the valve is nearly closed as well as manufacturing—particularly machining—requirements.

The bypass outlet 216 is shown with a peripheral lip 216a. The lip 216a is adapted to form a seal when interfacing with the sealing plate 314. For example, the lip 216a may include a ridge that presses against the sealing plate 314. The lip 216a is flat around the entire circumference to allow sealing plate 314 to form a substantially planar seal when pressing against the lip 216a. In addition, the sealing plate 314 and the lip 216a can expand and contract due to exhaust temperature variation without the seal being affected. As discussed in the foregoing, the sealing plate 314 is loosely coupled to the flapper arm 312.

The flapper arm 312 is adapted to rotate in the valve body 210. The flapper arm 312 is comprised of disc shaped steel although any suitable material and shape may be employed. The flapper arm 312 can press against the shoulder 214a without forming a fluid seal. That is, the flapper arm 312 can rest against the valve body 210 proximate to the evaporator outlet 214 such that exhaust is directed towards the bypass outlet 216 while still allowing exhaust to leak through to the evaporator outlet 214. Additionally, the flapper arm 312 may not adhere to the shoulder 214a.

The sealing plate 314 can be loosely coupled to the flapper arm 312 so as to be able to move relative to the arm and allow the sealing plate 314 to uniformly press against the lip 216a, amongst other things to allow for wear, fabrication tolerances and/or thermal movement. So pressed against the lip 216a, the sealing plate 314 can prevent exhaust flow to the bypass outlet 216. Although a single sealing plate 314 is shown, a second sealing plate 314 can be coupled to the other side of the flapper arm 312 by the rivet 316, as shown in FIG. 5, each plate being moveable relative to the arm as described above. In the embodiment shown in FIG. 3, the rivet 316 couples the sealing plate 314 and the rivet shell 318 to the flapper arm 312. Although the rivet 316 is shown as a round head rivet, any suitable fastening means may be employed. Similarly, various shapes of sealing plate—including flat, cupped, rolled-edge, etc—may be employed. For example, in alternative embodiments, the rivet 316 may be a screw that fastens to a threaded version of the rivet shell 318. The rivet shell 318 is shown as pressed against the sealing plate 314 by the rivet 316. Accordingly, the sealing plate 314, the rivet 316, and the rivet shell 318 form a rigid assembly. However, the rivet shell 318 can have an outside diameter that is smaller than an inside diameter of the flapper arm 312. The sealing plate 314 is therefore loosely coupled to the flapper arm 312. This loose coupling may allow the sealing plate 314 to tilt relative to a plane formed by the flapper arm 312. The sealing plate 314 may therefore uniformly press against the lip 216a when the flapper assembly 310 is rotated towards the bypass outlet 216.

Figure 4C:
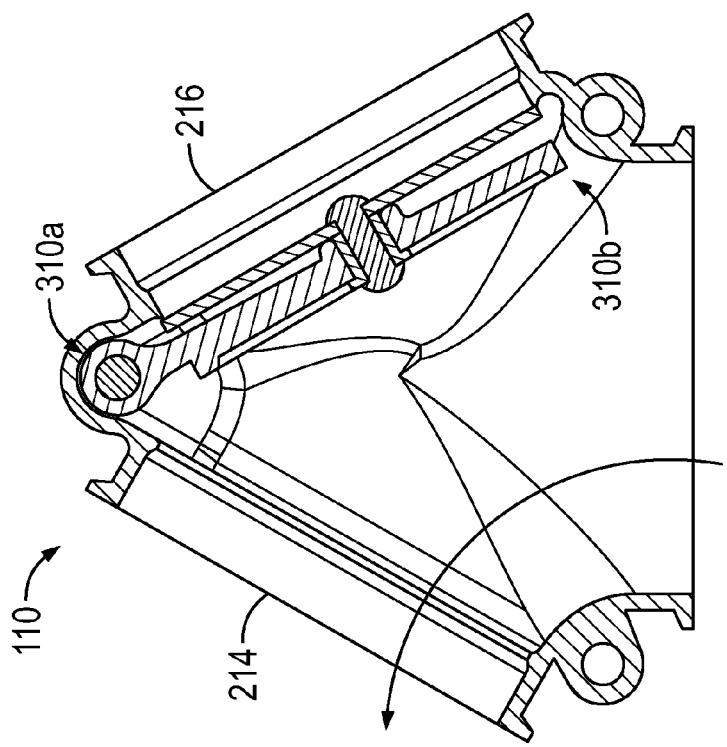

FIGS. 4a-c show the flapper assembly 310 in three positions according to an embodiment. As can be seen, the flapper assembly 310 is rotatably coupled to the valve body 210 at the shaft 230 near a first distal end or extremity 310a of the flapper assembly 310. A second, opposite distal end or extremity 310b of the flapper assembly 310 may be oriented towards the exhaust inlet 212 while the flapper assembly 310 is rotating as shown in FIGS. 4a-c. For example, even though the flapper assembly 310 lies adjacent the shoulder 214a in FIG. 4a, the second distal end 310b is oriented towards the exhaust inlet 212. Similarly, the second distal end 310b is shown as oriented towards the exhaust inlet 212 in FIG. 4c. Such orientation of the flapper assembly 310 may allow laminar exhaust flow through the flapper exhaust diverter valve 110. Accordingly, the flapper exhaust diverter valve 110 does not cause a pressure drop that exceeds specification.

In FIG. 4a, the flapper assembly 310 is shown as proximate to the evaporator outlet 214. In this position, the flapper assembly 310 diverts exhaust flow to the bypass outlet 216 along flow path P. In FIG. 4b, the flapper assembly 310 is shown midway between the evaporator outlet 214 and the bypass outlet 216. Exhaust may therefore flow equally to the evaporator outlet 214 and the bypass outlet 216. The flapper assembly 310 may rotate about 60 degrees between the evaporator outlet 214 and the bypass outlet 216. This range may allow the flapper assembly 310 to rotate without an undesirably large link 222 and cylinder 226. However, any suitable range may be employed.

In operation, the flapper exhaust diverter valve 110 rotates the flapper assembly 310 to direct exhaust to the evaporator 124. For example, the flapper assembly 310 may be rotated towards the evaporator outlet 214 to direct some of the exhaust towards the bypass outlet 216. As the flapper assembly 310 approaches the evaporator outlet 214, exhaust flow through the evaporator outlet 214 may be restricted. As the flapper arm 312 comes close to the shoulder 214a, a substantial majority of the exhaust may be diverted to flow through the bypass outlet 216. As can be seen from the arrow P shown in FIG. 4a, the flapper exhaust diverter valve 110 should not cause turbulence in the exhaust flow. Specifically, the extremity where the flapper arm 312 is coupled to the shaft 230 is a low flow area, substantially outside of the flow paths P and Q and outside of the aforementioned substantially planar seal when viewed in a direction normal to the plane of that seal, and therefore does not cause turbulence in the exhaust flow through the bypass outlet 216.

From the position shown in FIG. 4a, the flapper assembly 310 rotates to a position shown in FIG. 4c. During this rotation, the flapper assembly 310 is at a position that is equally between the evaporator outlet 214 and the bypass outlet 216 as shown in FIG. 4b. The exhaust may therefore flow equally between the evaporator outlet 214 and the bypass outlet 216. At the position shown in FIG. 4c, the sealing plate 314 in the flapper assembly 310 is pressed against the lip 216a to form a seal. As described in the foregoing, the sealing plate 314 is loosely coupled to the flapper arm 312. Accordingly, as the flapper arm 312 presses the sealing plate 314 into the lip 216a, the sealing plate 314 flattens against the lip 216a to form a seal. The seal ensures the exhaust flows to the evaporator 124 along flow path Q, preventing leakage of exhaust gas through the bypass that would otherwise affect the efficiency of the waste heat recovery system 100. Additionally, the transient pressures exerted by the flapper assembly 310 to the valve body 210 can be damped. For example, a spring or pneumatic pressure in the actuator 220 may dampen the force that is applied by the sealing plate 314 to the lip 216a.

The position of the flapper assembly 310 between the positions shown in FIGS. 4a and 4c can be modulated to regulate the flow of the exhaust to the evaporator 124. Accordingly, heat transfer to the working fluid can be controlled by controlling the volume of the exhaust flow to the evaporator 124. The modulation of the flapper assembly 310 may be controlled by a sensor (not shown) that senses, for example, the position of the flapper assembly 310 or the shaft 230. However, any suitable sensor, parameter, or the like may be employed to control the position of the flapper assembly 310.

The embodiments described in the foregoing provide a flapper exhaust diverter valve 110. As explained in the foregoing description, the flapper exhaust diverter valve 110 diverts the exhaust from exhaust pipe 102 to the evaporator 124 to provide heat to the waste heat recovery system 100. The flapper exhaust diverter valve 110 can also limit or prevent exhaust flow to the evaporator 124. This prevents the working fluid pressure from increasing beyond specification. In addition, the flapper exhaust diverter valve 110 can also regulate the flow of exhaust to the evaporator 124 so as to regulate the heat transfer rate to the working fluid. This ensures that the working fluid in the waste heat recovery system 100 is maintained at a desired temperature. The exhaust can also flow through the flapper exhaust diverter valve 110 with a pressure drop that does not exceed specification. This may be due to the orientation of the flapper assembly 310 and the placement of the shaft 230. The flapper assembly 310 can also direct the flow of the exhaust to the evaporator outlet 214 or the bypass outlet 216 without adhering to portions of the valve body 210 due to, for example, temperature variation in the exhaust system.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other exhaust diverter valves, and not just to the embodiments described above and shown in the accompanying figures. Accordingly, the scope of the embodiments described above should be determined from the following claims.

We claim:

1. An engine exhaust gas diverter valve (110), comprising:
   a valve body (210) comprising:
      an exhaust gas inlet (212),
      a first exhaust gas outlet (214) having a periphery, and
      a second exhaust gas outlet (216) having a periphery;
      the valve body defining a first exhaust gas flow path (Q) from the exhaust gas inlet (212) to the first exhaust gas outlet (214) and a second exhaust gas flow path (P) from the exhaust gas inlet (212) to the second exhaust gas outlet (216);
   a flapper assembly (310) coupled to the valve body (210) for rotation about a first axis (230) between a position in which it approaches the periphery of the first exhaust gas outlet (214) and a position in which it approaches the periphery of the second gas outlet (216), the first axis being located at a first extremity (310a) of the flapper assembly (310) and substantially outside of the first and second flow paths;
   wherein the flapper assembly (310) has a sealing fit with the periphery of the first exhaust gas outlet (214) when at a first limit and a clearance fit with the periphery of the second exhaust gas outlet (216) when at a second limit.

2. The engine exhaust gas diverter valve of claim 1 wherein the flapper assembly is configured to form a substantially planar seal with the periphery of the second exhaust gas outlet (216), the first axis lying outside of the seal when viewed in a direction normal to the plane of the seal.

3. The engine exhaust gas diverter valve of claim 1 wherein the flapper assembly (310) has a second, distal end (310b), remote from the first extremity, that is oriented towards the exhaust inlet (212) while rotating.

4. The engine exhaust gas diverter valve of claim 1, wherein the flapper assembly (310) comprises:
   a flapper arm (312) that is rotatably coupled to the valve body (210) via a shaft (230); and
   a sealing plate (314) coupled to the flapper arm (312).

5. The engine exhaust gas diverter valve of claim 4, wherein the periphery of the first exhaust gas outlet (214) comprises a shoulder (214a), the flapper arm being rotatable to an extreme position adjacent to the shoulder (214a) so as to restrict flow through the first exhaust gas outlet (214) and direct exhaust to the second exhaust gas outlet (216).

6. The engine exhaust gas diverter valve of claim 4, wherein the periphery of the second exhaust gas outlet (216) comprises a lip (216a), the flapper arm being rotatable to an extreme position adjacent the lip in which the sealing plate (314) presses against the lip so as to prevent exhaust gas flow through the second exhaust gas outlet (216) and divert exhaust through the first exhaust gas outlet (214).

7. The engine exhaust gas diverter valve of claim 4, wherein the sealing plate (314) is loosely coupled to the flapper arm (312).

8. The engine exhaust gas diverter valve of claim 4, wherein the flapper assembly (310) further comprises a rivet (316) and a rivet shell (318) that couples the seal plate (314) to a flapper arm (312).

9. The engine exhaust gas diverter valve of claim 1 and further comprising an actuator (220) adapted to rotate the flapper assembly (310) about the shaft (230).

10. A method of forming the engine exhaust gas diverter valve (110) of claim 1, the method comprising steps of:
forming a valve body (210) comprising an exhaust gas inlet (212), a first exhaust gas outlet (214), a second exhaust gas outlet (216); and
forming and rotatably coupling a flapper assembly (310) to the valve body (210) at a first distal end (310a) of the flapper assembly (310).

11. The method of claim 10, wherein the step of coupling the flapper assembly (310) to the valve body (210) comprises coupling the flapper assembly (310) such that a second distal end (310b) is oriented towards the exhaust inlet (212) while rotating.

12. The method of claim 11, wherein the step of forming the flapper assembly (310) comprises steps of:
forming and rotatably coupling a flapper arm (312) to the valve body (210) at a shaft (230); and
forming and coupling a sealing plate (314) to the flapper arm (312).

13. The method of claim 10 and comprising the steps of forming a shoulder (214a) on the evaporator outlet (214) and adapting the flapper arm to rotate to an extreme position adjacent to the shoulder (214a) so as to restrict flow through the first exhaust gas outlet (214) and direct exhaust to the second exhaust gas outlet (216).

14. The method of claim 12 and comprising the steps of forming a lip (216a) on the bypass outlet (216) and adapting the flapper arm to rotate to an extreme position adjacent the lip in which the sealing plate (314) presses against the lip so as to prevent exhaust gas flow through the second exhaust gas outlet (216) and divert exhaust through the first exhaust gas outlet (214).

15. The method of claim 12, wherein the step of forming the flapper assembly (310) further comprises loosely coupling the sealing plate (314) to the flapper arm (312).

16. The method of claim 12, wherein the step of forming the flapper assembly (310) further comprises forming a rivet (316) and a rivet shell (318) and coupling the seal plate (314) to the flapper arm (312) with the rivet (316) and the rivet shell (318).

17. The method of claim 10, further comprising the step of forming and adapting an actuator (220) to rotate the flapper assembly (310).

18. An engine exhaust gas diverter valve (110), comprising:
a valve body (210) defining:
an inlet (212) configured for exhaust gas inflow along a first axis;
a first outlet (214) configured for exhaust gas outflow along a second axis; and
a second outlet (216) configured for exhaust gas outflow along a third axis;
a valve member (310) for diverting exhaust gas inflow through the first and/or second outlets;
wherein the second and third axes are arranged symmetrically to either side of, and at an acute angle to, the first axis; and
wherein the valve member (310) has a sealing fit with the periphery of the first outlet (214) when at the first limit and a clearance fit with the periphery of the second outlet (216) when at a second limit.

19. The engine exhaust gas diverter valve of claim 18, wherein the second and third axes are each arranged at an angle to the first axis lying in the range from 40° to 80°.

20. The engine exhaust gas diverter valve of claim 19, wherein the second and third axes are each arranged at an angle to the first axis of about 60°.

21. An engine exhaust gas valve (110) comprising:
a valve body (210) comprising an exhaust gas inlet (212) and at least one exhaust gas outlet (214) having a periphery;
a flapper assembly (310) coupled to the valve body (210) for rotation into a position in which it forms a seal with the periphery of the first exhaust gas outlet, the assembly comprising:
a first member rotatably coupled to the valve body, and
a second member configured to sealingly engage the periphery of the first exhaust gas outlet and to move relative to the first member;
wherein the flapper assembly has a clearance fit with the periphery of the second exhaust gas outlet when at a second limit.

22. The engine exhaust gas valve of claim 21 and comprising first and second exhaust gas outlets each having a respective periphery, the flapper assembly having second members respectively configured to sealing engage the periphery of the first exhaust gas outlet and the periphery of the second exhaust gas outlet, the members being configured to move relative to the first member.

23. An engine exhaust gas diverter valve (110) comprising:
a valve body (210) comprising
an exhaust gas inlet (212),
a first exhaust gas outlet (214) having a periphery, and
a second exhaust gas outlet (216) having a periphery;
a flapper assembly (310) that is coupled to the valve body (210) for rotation between a first limit in which it approaches the periphery of the first exhaust gas outlet (214) and a second, opposite limit in which it approaches the periphery of the second gas outlet (216),
wherein the flapper assembly has a sealing fit with the periphery of the first exhaust gas outlet when at the first limit and a clearance fit with the periphery of the second exhaust gas outlet when at the second limit.

24. A system for recovering waste heat from the exhaust of an engine, the system comprising:
an evaporator adapted to transfer waste heat from an engine to a working fluid;
an evaporator bypass; and
an engine exhaust gas diverter valve according to any preceding claim,
wherein the first exhaust gas outlet is connected to the evaporator and the second exhaust gas outlet is connected to the evaporator bypass.

* * * * *